C. N. COLSTAD.
AUTOMOBILE LOCK.
APPLICATION FILED JULY 1, 1920.
1,393,754.
Patented Oct. 18, 1921.
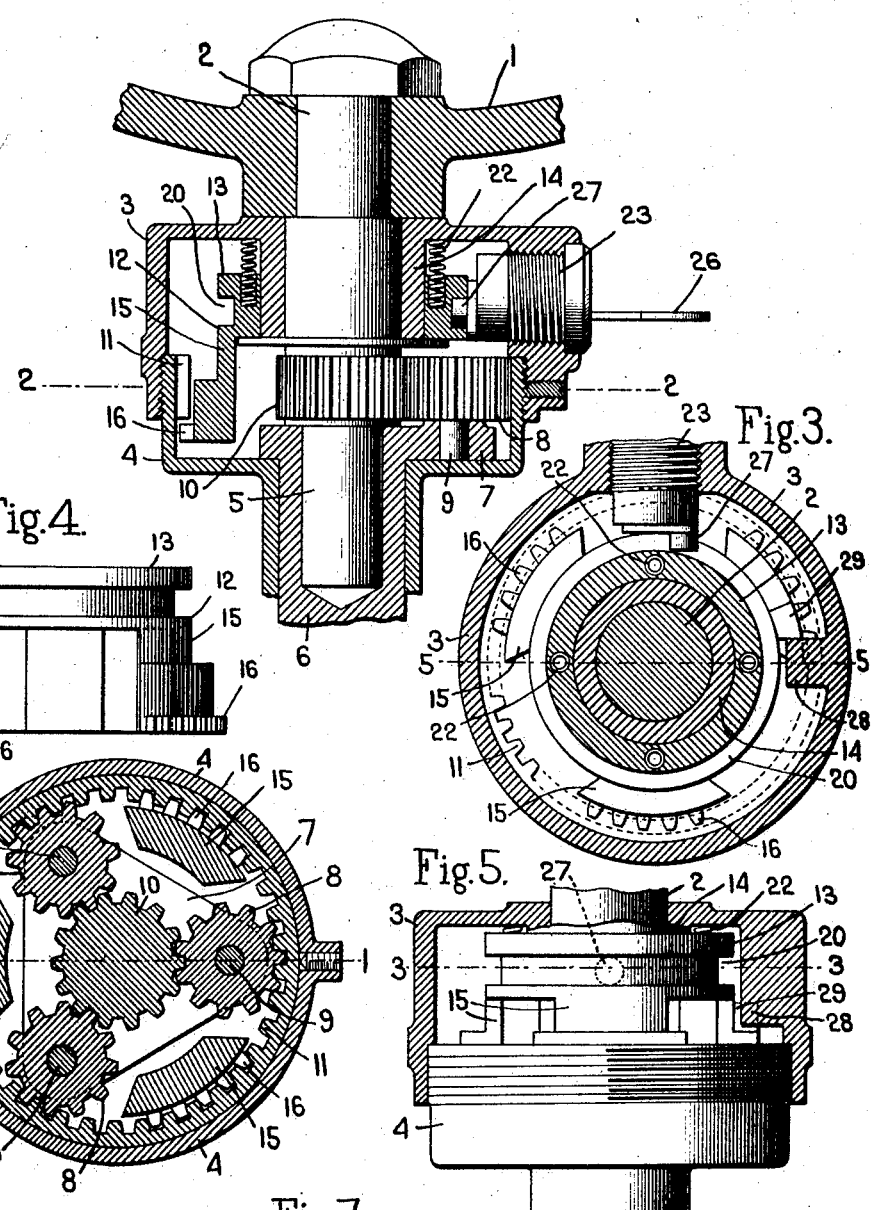
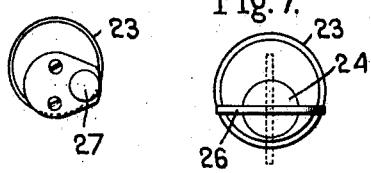
Inventor.
Charles N. Colstad
by Heard Smith & Tennant.
Attys.

UNITED STATES PATENT OFFICE.

CHARLES N. COLSTAD, OF NORFOLK DOWNS, MASSACHUSETTS, ASSIGNOR TO MASTERS MANUFACTURING COMPANY, OF BOSTON, MASSACHUSETTS, A CORPORATION OF MASSACHUSETTS.

AUTOMOBILE-LOCK.

1,393,754.  Specification of Letters Patent.  Patented Oct. 18, 1921.

Application filed July 1, 1920. Serial No. 393,270.

*To all whom it may concern:*

Be it known that I, CHARLES N. COLSTAD, a citizen of the United States, residing at Norfolk Downs, county of Norfolk, State of Massachusetts, have invented an Improvement in Automobile-Locks, of which the following description, in connection with the accompanying drawing, is a specification, like characters on the drawing representing like parts.

This invention relates to automobile locks of that type which lock the steering wheel, and particularly to locks adapted for use in automobiles having a steering gear of the type used in the well-known Ford automobile. The steering gear of this type comprises a stub shaft to which the steering wheel is fast and which carries a gear that meshes with planetary gears carried by a spider fast on the upper end of the steering shaft to which the steering arm is connected, said planetary gears meshing with internal stationary gears carried by the housing of the steering gear assembly.

My improved lock comprises a novel locking element which is constructed to rotate with the spider carrying the planetary gearing and which is normally free to rotate but which can be brought into interlocking engagement with the stationary internal teeth when the automobile is to be locked. This interlocking engagement with the stationary internal teeth locks the locking member from rotation and the latter in turn locks the spider and therefore the steering post from rotation.

In order to give an understanding of my invention I have illustrated in the drawings a selected embodiment thereof which will now be described, after which the novel features will be pointed out in the appended claims.

Figure 1 is a vertical sectional view through the housing carrying the planetary gearing of the steering gear assembly, said view being taken on substantially the line 1—1, Fig. 2;

Fig. 2 is a section on the line 2—2, Fig. 1;

Fig. 3 is a section on the line 3—3, Fig. 5;

Fig. 4 is a side view of the locking element;

Fig. 5 is a section on the line 5—5, Fig. 3;

Figs. 6 and 7 are views of the lock.

In the drawings 1 indicates the hub and a portion of the spider of a steering wheel which is fast on a stub shaft 2, said shaft extending through and being journaled in the cover 3 of a housing 4 which contains the steering gear assembly, the lower end 5 of said stub shaft being journaled in a recess in the upper end of the steering shaft 6 which extends through the steering post, and to the lower end of which the usual steering arm is secured.

The steering shaft 6 carries at its upper end a spider element 7 in which is journaled three planetary gears 8, each gear being rotatably mounted on a stud or pin 9. These gears mesh on the one hand with a gear 10 fast on the stub shaft 2, and on the other hand with internal stationary gear teeth 11 formed on the inside of the housing 4. With this construction the rotation of the stub shaft 2 by means of the steering wheel 1 will operate through the gear 10 to rotate the planetary gears 8, and since these mesh with the stationary gear teeth 11, the rotation of the planetary gears will produce a rotative movement of the spider 7 and steering shaft 6, the rotative movement of the shaft 6 being considerably less than that of the steering wheel.

The above is a brief description of the steering gear assembly of the well-known Ford automobile.

My improved lock comprises a locking element having such relation with the spider 7 as to rotate therewith, said locking element having gear teeth thereon which are normally situated out of mesh with the stationary gear teeth 11, so that said locking element is normally free to rotate, and being arranged so that it can be moved into a position in which the teeth thereon will have interlocking engagement with the stationary gear teeth, thus locking the steering shaft and steering wheel from rotative movement. The locking element is indicated generally at 12 and comprises a collar portion 13 which is mounted to rotate on the hub portion 14 of the cap 3, and three arms 15 depending from said collar, said arms being situated between the planetary gears 8 and having at their lower ends gear teeth 16 of a size to mesh with the stationary gear teeth 11. The locking member 12 is normally held in the position shown in Fig. 1 by suitable springs 22. When in this position the teeth 16 thereon are situated below the stationary teeth 11 so that said locking member is free to rotate about the hub 14. Since the arms of the locking member are situated between the planetary gears 8 it is normally free to rotate and when in the position shown in Fig. 1, it does not interfere with the operation of the steering gear. On the other hand, it will simply rotate about the hub 14 as the spider 7 and planetary gears 8 are carried around inside of the casing or housing.

Means are provided for raising the locking member to bring the gear teeth 16 into mesh with the stationary gear teeth 11, and when in this position the rotation of said locking member is prevented by the stationary gear teeth 11, and the locked locking member in turn will prevent the steering shaft 6 from being rotated, thus locking the steering gear from being operated.

Any suitable way of raising the locking member into its operative position may be employed, but I will preferably use a key-actuated device. The key device herein shown is somewhat similar to the ordinary cylinder lock and comprises a cylinder member 23 which is screwed into the cap 3 of the housing and in which is rotatably mounted a barrel 24 having the key slot therein. The barrel and the cylinder carry tumblers as usual in cylinder locks, said tumblers being so arranged that when a key 26 of the proper shape is inserted into the key slot, the tumblers will be lined up to permit the barrel to be turned. The barrel carries at its inner end a projection 27 situated eccentrically thereof and adapted to enter a groove 20 formed in the collar 13. When the barrel is turned by the key so as to move the projection 27 upwardly, this operation will elevate the locking member so as to bring the teeth 16 thereon into mesh with the stationary teeth 11, thus locking the steering gear.

The key portion of the lock is so arranged that when the barrel is turned into a position to permit the key to be withdrawn from the key slot, as shown in dotted lines Fig. 7, the yoke is in its elevated position and the lock is, therefore, operative. In order to unlock the car, the operator places the key in the keyhole slot and turns the key a quarter of a turn into the full line position Fig. 7, thus giving the barrel a quarter turn movement which lowers the locking member and carries the teeth 16 out of mesh with the stationary teeth 11. When in this position the key 26 cannot be removed from the lock and, therefore, said key will remain in the lock so long as the automobile is unlocked. To lock the automobile, the operator turns the key 26 into position for withdrawing the key from the lock and in doing this elevates the locking member 12 so as to bring the teeth 16 thereon into mesh with the stationary teeth 11. This locks the car, and after the key 26 has been removed, the car can be unlocked only by a person who has the proper key to fit the lock. Thus with my invention, the key 26 cannot be removed from the lock unless the car is locked, and hence a person is assured that his automobile is locked whenever he has removed the key therefrom.

My invention is of such a nature that it can be readily applied to any automobile having the steering gear of the type herein illustrated. All that it is necessary to do is to remove the steering wheel from the stub shaft 2 and then remove the cap of the housing and replace this cap with a cap 3, such as shown in the drawings and which has therein the locking member 12 and the key device 23, 26. The substitution of the cap 3 with the parts above enumerated for the ordinary cap with which the housing 4 of automobiles of this type is normally equipped can be performed by any one in a short time, and my lock, therefore, is of such a nature that it can be applied to an automobile of this type by any one and without the necessity of employing a skilled mechanic for this purpose.

The device herein shown is so constructed that the raising of the locking member into its operative locking position will not only lock the steering wheel from being turned but will also lock the cap 3 from being unscrewed thereby making it impossible for any person to tamper with the lock by removing the cap. The locking member 12 is provided at one side with a lug 29 and the cap 3 is also provided with an inwardly-extending lug or projection 28. This lug 28 is so shaped relative to the lug 29 that when the locking member is in its lowered inoperative position shown in Fig. 1, the lug 29 is situated entirely beneath the lower end of the lug 28, and, therefore, the locking member is free to rotate. When, however, the locking member is raised into its operative locking position shown in Fig. 5, the lug 29 is moved up above the lower end of the lug 28, as indicated in Fig. 5. When in this position the lug 29 will prevent the cap from being turned through a complete revolution thereby making it impossible for an unauthorized person to remove the cap 3.

While I have illustrated a selected embodiment of my invention, I do not wish to be limited to the constructional features shown.

I claim:

1. In an automobile lock, the combination with a stationary housing having internal gear teeth, of a steering shaft carrying planetary gearing meshing with said gear teeth, a stub shaft to which the steering wheel is attached, a gear thereon meshing with said planetary gearing, a locking element rotatable with said steering shaft, and means to cause said locking element to have interlocking engagement with said stationary gear teeth thereby to lock said steering shaft from rotation.

2. In an automobile lock, the combination with a stationary housing having internal gear teeth, of a steering shaft carrying planetary gearing meshing with said gear teeth, a stub shaft to which the steering wheel is attached, a gear thereon meshing with said planetary gearing, a locking element rotatable with said steering shaft and having gear teeth thereon normally out of mesh with the stationary gear teeth, and means to shift said locking member to bring its gear teeth into mesh with the stationary gear teeth.

3. In an automobile lock, the combination with a stationary housing having internal gear teeth, of a steering shaft, planetary gears carried by said shaft and meshing with said stationary gear teeth, a cap for the housing, a stub shaft extending through said cap and having a gear thereon meshing with said planetary gears, a locking member rotatable with the steering shaft and having depending arms situated between the planetary gears, said arms having gear teeth normally out of mesh with the stationary gear teeth of the housing, and means for shifting said locking member axially of the stub shaft to bring the teeth thereon into mesh with the stationary teeth of the housing.

4. In an automobile lock, the combination with a stationary housing having internal gear teeth, of a steering shaft, planetary gears carried by said shaft, and meshing with said stationary gear teeth, a cap for the housing, a stub shaft extending through said cap and having a gear thereon meshing with said planetary gears, a locking member rotatable with the steering shaft and having depending arms situated between the planetary gears, said arms having gear teeth normally situated below the stationary gear teeth of the housing, and means to raise the locking member to bring the teeth thereon into mesh with said stationary teeth.

5. In an automobile lock, the combination with a stationary housing having internal gear teeth, of a steering shaft, planetary gears carried by said shaft, and meshing with said stationary gear teeth, a cap for the housing, a stub shaft extending through said cap and having a gear thereon meshing with said planetary gears, a locking member rotatable with the steering shaft and having depending arms situated between the planetary gears, said arms having gear teeth normally out of mesh with the stationary gear teeth of the housing, and a key device for shifting said locking member axially of the stub shaft to bring the teeth thereon into mesh with the stationary teeth of the housing.

6. In an automobile lock, the combination with a stationary housing having internal gear teeth, of a steering shaft, planetary gears carried by said shaft, and meshing with said stationary gear teeth, a cap for the housing, a stub shaft extending through said cap and having a gear thereon meshing with said planetary gears, a locking member rotatable with the steering shaft and having depending arms situated between the planetary gears, said arms having gear teeth normally out of mesh with the stationary gear teeth of the housing, and a key device for shifting said locking member axially of the stub shaft to bring the teeth thereon into mesh with the stationary teeth of the housing, said key device comprising a removable key and a lock-member-shifting element actuated thereby.

7. In an automobile lock, the combination with a stationary housing having internal gear teeth, of a steering shaft, planetary gears carried by said shaft, and meshing with said stationary gear teeth, a cap for the housing, a stub shaft extending through said cap and having a gear thereon meshing with said planetary gears, a locking member rotatable with the steering shaft and having depending arms situated between the planetary gears, said arms having gear teeth normally out of mesh with the stationary gear teeth of the housing, and a key device for shifting said locking member axially of the stub shaft to bring the teeth thereon into mesh with the stationary teeth of the housing, said key device comprising a removable key and a lock-member-shifting element actuated thereby, said key being removable from the key device only when the lock member is in operative locking position.

8. In an automobile lock, the combination with a stationary housing having internal gear teeth, of a cap screw-threaded to the housing, a steering shaft, planetary gears carried by said shaft and meshing with said stationary gear teeth, a stub shaft extending through the cap and having a gear thereon meshing with said planetary gears, a locking member rotable with the steering shaft and having depending arms situated between the planetary gears, said arms having gear teeth normally out of mesh with the stationary gear teeth of the housing, means for shifting said locking member axially of the stub shaft to bring the teeth thereon into mesh with the stationary teeth of the housing, and means to lock the cap from being unscrewed from the housing by the locking member when the latter is in operative position.

9. In an automobile lock, the combination with a stationary housing having internal gear teeth, of a cap screw-threaded to said housing, a steering shaft carrying planetary gearing meshing with said gear teeth, a stub shaft extending through the cap and to which the steering wheel is attached, a gear on the stub shaft meshing with said planetary gears, a locking element rotatable with the steering shaft, means to cause said locking element to have interlocking engagement with said stationary gear teeth thereby to lock the steering shaft from rotation, and means carried by said locking member to lock the cap from being unscrewed when said locking member has interlocking engagement with the stationary gear teeth.

In testimony whereof, I have signed my name to this specification.

CHARLES N. COLSTAD.